United States Patent [19]

Saitoh et al.

[11] 4,132,633

[45] Jan. 2, 1979

[54] METHOD FOR SEPARATING MIXTURE OF PLASTICS

[75] Inventors: Kozo Saitoh, Tokyo; Sumio Izumi, Sayama, both of Japan

[73] Assignee: Mitsui Mining & Smelting Co., Ltd., Muromachi, Japan

[21] Appl. No.: 558,606

[22] Filed: Mar. 14, 1975

[30] Foreign Application Priority Data

Mar. 14, 1974 [JP] Japan ............................ 49-29335
Mar. 14, 1974 [JP] Japan ............................ 49-29336

[51] Int. Cl.$^2$ .............................................. B03B 1/00
[52] U.S. Cl. ........................................ 209/9; 209/167
[58] Field of Search ............... 209/166, 162, 163, 164, 209/165; 210/44; 162/4.5

[56] References Cited

U.S. PATENT DOCUMENTS

| | | | |
|---|---|---|---|
| 1,966,649 | 7/1934 | Schranz | 209/166 |
| 2,378,152 | 6/1945 | Nagelwurt | 209/2 |
| 3,074,653 | 1/1963 | Schorsch | 209/3 X |
| 3,224,582 | 12/1965 | Iannicelli | 209/166 |
| 3,240,556 | 3/1966 | Bhappu | 209/166 X |
| 3,284,282 | 11/1966 | Immel | 209/3 |
| 3,335,966 | 8/1967 | Mauemon | 209/173 X |
| 3,925,200 | 12/1975 | Izumi | 209/166 X |
| 3,985,650 | 10/1976 | Saitoh et al. | 210/44 |

FOREIGN PATENT DOCUMENTS

2513151 3/1975 Fed. Rep. of Germany .............. 209/3

OTHER PUBLICATIONS

Chem. Abstracts, vol. 79, 1973, 34881j.
Modern Packaging Encyclopedia Issue, vol. 41, No. 74, Jul. 1968, pp. 164 and 165.

Primary Examiner—Frank Sever
Attorney, Agent, or Firm—Sughrue, Rothwell, Mion, Zinn and Macpeak

[57] ABSTRACT

A method for separating a mixture of plastics of at least two components selected from the group consisting of polyethylene, polypropylene and a polystyrene, which comprises placing the mixture of plastics in a separation cell containing an aqueous liquid medium containing at least one wetting agent, and introducing gas bubbles into the cell thereby to cause the gas bubbles to selectively adhere to the surface of the polypropylene and/or polyethylene and float the polypropylene and/or polyethylene when the mixture of plastics comprises a polystyrene and polypropylene and/or polyethylene or to selectively adhere to the surface of the polypropylene and float the polypropylene when the mixture of plastics comprises polypropylene and polyethylene with the polypropylene and/or the polyethylene being recovered as a float and the polystyrene being recovered as a residue when the mixture of plastics comprises a polystyrene and polypropylene and/or polyethylene, and with the polypropylene being recovered as a float and the polyethylene being recovered as a residue when the mixture of plastics comprises polypropylene and polyethylene.

18 Claims, No Drawings

METHOD FOR SEPARATING MIXTURE OF PLASTICS

BACKGROUND OF THE INVENTION

1. Field of the Invention

This invention relates to a method for separating a mixture of different plastics into each of the plastics.

2. Description of the Prior Art

Methods have been described for separating and recovering plastics from mixed plastics or a mixture of plastics and non-plastics substances using flotation as disclosed in copending U.S. patent applications, Ser. No. 443,574 filed Feb. 19, 1974, Ser. No. 443,936 filed Feb. 19, 1974, Ser. No. 443,937 filed Feb. 19, 1974, Ser. No. 469,723 filed May 14, 1974, Ser. No. 469,921 filed May 14, 1974, Ser. No. 469,922 filed May 14, 1974 and Ser. No. 469,925 filed May 14, 1974.

However, no method for separating a mixture of a polystyrene and a polyolefin such as polyethylene and polypropylene or a mixture of polyethylene and polypropylene is known due to the close similarity in physical properties, such as specific gravity and the like of these materials. Therefore, mixtures of these materials in industrial and household waste have hithertofore been disposed of.

SUMMARY OF THE INVENTION

A number of studies on the flotation characteristics of plastics have been made, and it has now been found that while all plastics, i.e., a polystyrene, polyethylene and polypropylene, are hydrophobic in an aqueous liquid medium, the presence of a wetting agent imparts to the plastics a difference in wettability of the surfaces of the plastics in the aqueous liquid medium, whereby the mixture of plastics can be separated into each plastic by taking advantage of the above-described difference in wettability in the aqueous liquid medium.

Therefore, the invention provides a method for separating a mixture of plastics of at least two components selected from the group consisting of polyethylene, polypropylene and a polystyrene in an aqueous liquid medium containing a wetting agent with ease and high efficiency into each plastic by introducing gas bubbles thereby to cause the gas bubbles to selectively adhere to the surface of the polypropylene and/or polyethylene and float the polypropylene and/or polyethylene when the mixture of plastics comprises a polystyrene and polyethylene and/or polypropylene or to selectively adhere to the surface of the polypropylene and float the polypropylene when the mixture of plastics comprises polypropylene and polyethylene with the polypropylene and/or the polyethylene being recovered as a float and the polystyrene being recovered as a residue when the mixture of plastics comprises a polystyrene and polyethylene and/or polypropylene, and with the polypropylene being recovered as a float and the polyethylene being recovered as a residue when the mixture of plastics comprises polypropylene and polyethylene.

DETAILED DESCRIPTION OF THE INVENTION

When a mixture of a polystyrene and a polyolefin such as polyethylene, polypropylene or a mixture thereof is employed, the surface of the polystyrene becomes more hydrophilic than that of the polyolefin in the aqueous liquid medium in the presence of a wetting agent. Therefore, by introducing gas bubbles into an aqueous medium containing the mixture of the plastics and a wetting agent, the gas bubbles selectively adhere to the surface of the polyolefin thereby floating the polyolefin on the surface of the aqueous liquid medium. Further, when a mixture of polyolefins, i.e., polyethylene and polypropylene, is employed, polyethylene and polypropylene having substantially similar wettability in the aqueous liquid medium, the wetting agent selectively makes the surface of the polyethylene more hydrophilic than that of the polypropylene in the aqueous liquid medium. Therefore, the gas bubbles adhere to the surface of the polypropylene thereby floating the polypropylene on the surface of the aqueous liquid medium.

The polyolefins which can be separated in the present invention include thermoplastic resins or plastics which can be obtained by polymerizing or copolymerizing an olefin monomer or a mixture of olefin monomers, and are exemplified by polyethylene and polypropylene. The polystyrenes which can be separated in the present invention include thermoplastic resins or plastics which can be obtained by polymerizing a styrene monomer, and are exemplified by polystyrene, an acrylonitrile-butadiene-styrene (ABS) resin, an acrylonitrilestyrene (AS) resin and the like.

In the process of this invention, the shape and size of these plastics which can be separated are not particularly limited, but from the standpoint of handling and economy, the size of the plastics treated preferably is about 50 mm or less.

Examples of wetting agents which can be used to selectively improve the wettability of the plastics in the aqueous liquid medium and thus achieve separation include sodium lignin sulfonate, calcium lignin sulfonate, tannic acid, a quebracho extract, gelatin, glue, saponin and the like. The wetting agent can be used individually or as a mixture thereof. A suitable amount of the wetting agent employed ranges from about 1 to 500g, preferably 1 to 100g, per ton of the plastics mixture to be treated. After addition of the wetting agent, stirring is preferably employed for several minutes, e.g., about 1 to 10 minutes.

Subsequently, an aeration is conducted in a manner well known in conventional flotation procedures such as, for example, mechanically stirring the aqueous liquid medium, bubbling a gas through the aqueous liquid medium, release of gases dissolved under pressure in the aqueous liquid medium, vacuum evacuation to release gases dissolved in the aqueous liquid medium, electrolysis of the aqueous liquid medium or a combination of these methods. The gases which can suitably be used include air, oxygen, nitrogen, carbon dioxide, inert gases such as argon, etc.

The shape of the cell used in the separation process of this invention can be, for example, a well known tetragonal, regular or non-regular polygonal or circular type, and also can be a trough type, a thickener type or a cyclone type.

A suitable proportion of the plastics in the aqueous liquid medium ranges from about 1 to 10 parts, preferably 2 to 6 parts, per 100 parts by weight of the aqueous liquid medium. The aqueous liquid medium is generally used at room temperature (e.g., about 20° to 30° C), but warm water of, e.g., about 30° to 60° C, can also be used.

In the method of the present invention, water is generally used as the aqueous liquid medium, but salt water can also be used. Suitable examples of salt water include sea water, brine, bittern-containing water as well as aqueous solutions containing halides such as NaCl, $CaCl_2$, $MgCl_2$, $MgBr_2$, etc., sulfates such as $MgSO_4$, $CaSO_4$, $K_2SO_4$, $Na_2SO_4$, etc., and bicarbonates such as $Ca(HCO_3)_2$, $NaHCO_3$, etc.

The pH of the aqueous liquid medium used in the method of this invention can vary over a wide range, e.g., about 5 to 10. Furthermore, the aqueous liquid medium used in this invention can contain inorganic or organic substances which are found in river water, industrial water, etc., without impairing the separation results obtained.

After completion of the flotation, the float is recovered by scraping out, and the residue is also recovered with a tail medium. The thus recovered materials can be permitted to reuse.

According to the present invention, the plastics mixtures are subjected to separation into each plastic by a flotation method which is characterized by controlling the wettability of each of the plastics in the aqueous liquid medium in the presence of the wetting agent. The operation of the method is simple, and the treatment is inexpensive. Moreover, the method lends itself to a continuous treatment of large quantities of plastics. Accordingly, the method of this invention is quite valuable as a method for the separation of waste plastics, thereby permitting the separated plastics to be recovered and reused.

The present invention is further illustrated in greater detail by the following Examples, but the Examples are not to be construed as limiting the scope of this invention. Unless otherwise indicated, all parts, percents, ratios and the like are by weight.

EXAMPLE 1

A mixture of 44.5 parts of polypropylene having a long, slender tubular shape and 55.5 parts of polystyrene having a similar shape was cut into pieces having a size of about 6 mm or less using a cutter for plastics and 200 g of the resulting pieces was placed in a flotation cell of a rectangular type containing 8,000 ml of water. 20 g of tannic acid was added thereto per ton of the plastics mixture and the liquid aqueous medium containing the plastic mixture was stirred for 2 minutes followed by introducing air bubbles thereinto for 5 minutes. As a result, 92.6 g of a float having a polypropylene-purity of 96.1% and 107.4 g of a residue having a polystyrene-purity of 100% were obtained. The separation was carried out with a quite high efficiency, and the materials thus obtained with high purities were quite appropriate for reuse.

The purity of each of the separated materials set forth above was determined by measuring the toluene-soluble content, i.e., the polystyrene content, and the toluene-insoluble residue content, i.e., the polypropylene content, of the material.

EXAMPLE 2

Each of a commercially available polypropylene product and an ABS product was cut into pieces having a size of about 6 mm or less, and 50 parts of each of the resulting polypropylene and ABS was mixed to obtain a mixture. In order to measure the purity of each of the separated materials with ease, polypropylene and ABS which were different in color from each other were employed. 200 g of the above-described mixture was placed in the same apparatus as employed in Example 1 containing 8,000 ml of water, and 30 g of sodium lignin sulfonate was then added thereto per ton of the plastics mixture. After stirring the aqueous liquid medium containing the plastics mixture for 2 minutes, air bubbles were introduced thereinto for 6 minutes to obtain 99 g of a float having a polypropylene-purity of 98.8% and 101 g of a residue having an ABS-purity of 97.8%. Thus, the separation was carried out with a quite high efficiency.

Further, a mixture of (a) polyethylene and polystyrene, (b) polyethylene and ABS resin and (c) polypropylene and AS resin, respectively, was subjected to the flotation-separation procedure according to the present invention and almost the same separation results as described above were obtained.

EXAMPLE 3

50 parts of polypropylene having a size of about 5 mm or less was mixed with 50 parts of polyethylene having a similar size to obtain a mixture. In order to measure the purity of each of the separated materials with ease, polypropylene and polyethylene which were different in color from each other were employed.

200 g of the resulting mixture was placed in a flotation call containing 8,000 ml of water. 10 g of sodium lignin sulfonate was added thereto per ton of the plastics mixture and the aqueous liquid medium containing the plastics mixture was stirred for 2 minutes followed by introducing air bubbles thereinto for 6 minutes. As a result, 98.4 g of a float having a polypropylene-purity of 98.8% and 101.6 g of a residue having a polyethylene-purity of 97.3% were obtained. Thus, the separation was carried out with a quite high efficiency.

EXAMPLE 4

40 parts of polypropylene having a size of about 3 mm was mixed with 30 parts of polyethylene and 30 parts of polystyrene, each having a similar size, to obtain a mixture. In order to measure the purity of each of the separated materials with ease, polypropylene, polyethylene and polystyrene which were different in color from each other were employed.

200 g of the resulting mixture was placed in a flotation cell containing 8,000 ml of water. 20 g of tannic acid was then added thereto per ton of the plastics mixture, and the aqueous liquid medium containing the plastic mixture was stirred for 2 minutes followed by introducing air bubbles into the mixture for 7 minutes. As a result, polypropylene and polyethylene floated on the surface of the water and thus could be separated from polystyrene as a residue.

The resulting floated materials comprising a mixture of polypropylene and polyethylene were further placed in the above-described flotation cell. 6 g of sodium lignin sulfonate was then added thereto per ton of the plastics mixture and the aqueous liquid medium containing the mixture of polypropylene and polyethylene was stirred for 2 minutes followed by introducing air bubbles thereinto for 6 minutes. Thus, polypropylene was separated as a float from polyethylene as a residue. The purities of the three kinds of plastic materials thus separated were measured using the difference in color. As a result, it was found that the purities and collecting yields of all of these materials exceeded 97%, respectively.

While the invention has been described in detail and with reference to specific embodiments thereof, it will be apparent to one skilled in the art that various changes and modifications can be made therein without departing from the spirit and scope thereof.

What is claimed is:

1. A method for separating polyethylene and/or polypropylene from a mixture of plastics consisting of a polystyrene and at least one of polyethylene and polypropylene, which comprises dispersing a mixture of said plastics in an aqueous liquid medium along with at least one wetting agent in an amount sufficient and continuing the dispersing for a time sufficient to make the surface of the polystyrene more hydrophilic than that of the polypropylene and/or polyethylene; discontinuing the dispersing while introducing gas bubbles into the mixture, whereby the gas bubbles selectively adhere to the surface of the polypropylene and/or polyethylene and float the polypropylene and/or polyethylene; and recovering the polyethylene and/or polypropylene as a float and leaving the polystyrene as a residue.

2. The method of claim 1, wherein said polystyrene is polystyrene, an acrylonitrile-butadiene-styrene resin or an acrylonitrile-styrene resin.

3. The method of claim 1, wherein the proportion of said mixture in said aqueous liquid medium ranges from about 1 to 10 parts by weight per 100 parts by weight of said aqueous liquid medium.

4. The method of claim 1, wherein said wetting agent is sodium lignin sulfonate, calcium lignin sulfonate, tannic acid, a quebracho extract, gelatin, glue or saponin.

5. The method of claim 4, wherein the proportion of said wetting agent in said aqueous liquid medium ranges from about 1 to 500g per ton of said mixture of plastics.

6. The method of claim 1, wherein said separation is carried out at a temperature of from about 20° to 60° C.

7. The method of claim 1, wherein said aqueous liquid medium is water or salt water.

8. The method of claim 7, wherein said salt water is sea water, brine, bittern-containing water or an aqueous solution of a halide, a sulfate or a bicarbonate.

9. The method of claim 1, wherein said mixture of plastics consists of a mixture of polyethylene, polypropylene and a polystyrene and wherein said method includes dispersing the polyethylene and the polypropylene recovered as a float in an aqueous liquid medium along with at least one wetting agent in an amount sufficient and continuing the dispersing for a time sufficient to make the surface of the polyethylene more hydrophilic than that of the polypropylene; discontinuing the dispersing while introducing gas bubbles into the mixture, whereby the gas bubbles selectively adhere to the surface of the polypropylene and recovering the polypropylene as a float and leaving the polyethylene as a residue.

10. A method of separating polypropylene from a mixture of plastics consisting of polypropylene and a polystyrene, which comprises dispersing a mixture of said plastics in an aqueous medium along with at least one wetting agent in an amount sufficient and continuing the dispersing for a time sufficient to make the surface of the polystyrene more hydrophilic than that of the polypropylene; discontinuing the dispersing while introducing gas bubbles into the mixture, whereby the gas bubbles selectively adhere to the surface of the polypropylene and float the polypropylene, and recovering the polypropylene as a float and leaving the polystyrene as a residue.

11. The method of claim 10, wherein said wetting agent is sodium lignin sulfonate, calcium lignin sulfonate, tannic acid, a quebracho extract, gelatin, glue or saponin.

12. The method of claim 11, wherein the proportion of said wetting agent in said aqueous liquid medium ranges from about 1 to 500 g per ton of said mixture of plastics.

13. A method of separating polyethylene from a mixture of plastics consisting of polyethylene and a polystyrene, which comprises dispersing a mixture of said plastics in an aqueous medium along with at least one wetting agent in an amount sufficient and continuing the dispersing for a time sufficient to make the surface of the polystyrene more hydrophilic than that of the polyethylene; discontinuing the dispersing while introducing gas bubbles into the mixture, whereby the gas bubbles selectively adhere to the surface of the polyethylene and float the polyethylene; and recovering the polyethylene as a float and leaving the polystyrene as a residue.

14. The method of claim 13, wherein said wetting agent is sodium lignin sulfonate, calcium lignin sulfonate, tannic acid, a quebracho extract, gelatin, glue or saponin.

15. The method of claim 14, wherein the proportion of said wetting agent in said aqueous liquid medium ranges from about 1 to 500 g per ton of said mixture of plastics.

16. A method of separating polypropylene from a mixture of plastics consisting of polypropylene and polyethylene, which comprises dispersing a mixture of said plastics in an aqueous medium along with at least one wetting agent in an amount sufficient and continuing the dispersing for a time sufficient to make the surface of the polyethylene more hydrophilic than that of the polypropylene; discontinuing the dispersing while introducing gas bubbles into the mixture, whereby the gas bubbles selectively adhere to the surface of the polypropylene and float the polypropylene; and recovering the polypropylene as a float and leaving the polyethylene as a residue.

17. The method of claim 16, wherein said wetting agent is sodium lignin sulfonate, calcium lignin sulfonate, tannic acid, a quebracho extract, gelatin, glue or saponin.

18. The method of claim 17, wherein the proportion of said wetting agent in said aqueous liquid medium ranges from about 1 to 500 g per ton of said mixture of plastics.

* * * * *